US010891577B2

(12) United States Patent
Joslin et al.

(10) Patent No.: US 10,891,577 B2
(45) Date of Patent: Jan. 12, 2021

(54) SYSTEM, METHOD, AND ARTICLE OF MANUFACTURE FOR ANALYZING AND SELECTIVELY FURTHER PROCESSING A DOCUMENT

(71) Applicant: Gravic, Inc., Malvern, PA (US)

(72) Inventors: Steven P. Joslin, Downingtown, PA (US); Owen C. Davison, Honey Brook, PA (US); Victor F. Berutti, Glenmoore, PA (US); Bruce D. Holenstein, Media, PA (US)

(73) Assignee: GRAVIC, INC., Malvern, PA (US)

( * ) Notice: Subject to any disclaimer, the term of this patent is extended or adjusted under 35 U.S.C. 154(b) by 272 days.

(21) Appl. No.: 13/727,055

(22) Filed: Dec. 26, 2012

(65) Prior Publication Data

US 2014/0180797 A1 Jun. 26, 2014

(51) Int. Cl.
*G06Q 10/06* (2012.01)
*G06Q 30/02* (2012.01)
*G06K 9/00* (2006.01)

(52) U.S. Cl.
CPC ..... *G06Q 10/0639* (2013.01); *G06K 9/00449* (2013.01); *G06Q 10/06395* (2013.01); *G06Q 30/0245* (2013.01)

(58) Field of Classification Search
CPC .............. G06Q 30/02; G06F 17/30011; G06F 17/30879
USPC ............................................ 705/14.44, 14.45
See application file for complete search history.

(56) References Cited

U.S. PATENT DOCUMENTS

| | | | |
|---|---|---|---|
| 6,448,979 B1 * | 9/2002 | Schena et al. ................ 715/741 |
| 7,298,901 B2 * | 11/2007 | McIntosh et al. ............ 382/182 |
| 8,121,944 B2 * | 2/2012 | Norman ................ G06Q 20/10 705/39 |
| 8,336,779 B1 * | 12/2012 | Porter ...................... 235/462.41 |
| 8,561,882 B2 * | 10/2013 | Stone et al. .................. 235/375 |
| 2002/0046095 A1 * | 4/2002 | Wallace ........................... 705/14 |
| 2003/0195807 A1 * | 10/2003 | Maggio ................ G06Q 30/02 705/14.35 |
| 2005/0004885 A1 * | 1/2005 | Pandian et al. ................... 707/1 |
| 2006/0192762 A1 * | 8/2006 | Corrion ......................... 345/166 |

(Continued)

OTHER PUBLICATIONS

"All in Learning" http://www.allinlearning.com/assist-app/bubble-sheet-for-scan-it/ Jul. 7, 2011 (see attached document).*

(Continued)

*Primary Examiner* — Victoria E Frunzi
(74) *Attorney, Agent, or Firm* — Panitch Schwarze Belisario & Nadel LLP

(57) ABSTRACT

A method and article of manufacture are provided for detecting message impressions from a document. The document includes one or more data collection areas adapted to receive input, and one or more message areas. Each message area includes a message. Memory representations of messages are stored in a memory. The document is received at a document processing engine which is adapted to access the memory to obtain the representations of messages. Message impressions are detected from the document by analyzing the document in the document processing engine. Message impressions are detected if it is determined that there is relevant input in the one or more data collection areas, and the document includes a representation of one or more of the messages.

51 Claims, 17 Drawing Sheets

30 Question Test Form with Message

(56) References Cited

U.S. PATENT DOCUMENTS

2008/0264701 A1* 10/2008 Radtke et al. ............. 178/19.01
2012/0072280 A1* 3/2012 Lin ................... G06Q 30/0246
                                                                                                                        705/14.45

OTHER PUBLICATIONS

"All in Learning" http://www.allinlearning.com/assist-app/bubble-sheet-for-scan-it/ Jul. 7, 2011.*

Trevor Hughes, "Advertising in schools becoming more common." USA Today, Jun. 3, 2012, downloaded from web page: http://www.9news.com/news/local/article/229521/346/District-to-place-ad-on-report-cards, 2 pages.

Greg Toppo and Janet Kornblum, "Ads on tests add up for teacher." USA Today, Dec. 1, 2008, downloaded from web page: http://usatoday30.usatoday.com/news/education/story/2012-06-03/advertising-in-schools/55366346/1, 1 page.

Lori Obert and Nelson Garcia, "District to place ad on report cards." KUSA-TV, Nov. 13, 2011, downloaded from: http://usatoday30.usatoday.com/news/education/2008-12-01-test-ads_N.htm, 2 pages.

\* cited by examiner

Exam Answer Sheets

Student ID:

- Please follow directions on exam questions sheet.
- Fill in circle completely
- To make changes, erase marks completely Figure 1: Prior Art- Filled-in Exam Answer Sheet

Figure 2: Prior Art- Satisfaction Survey

Patient Survey
Mid County General Hospital

Please evaluate the following aspects of your recent stay in our facility:
(1) The importance of each aspect to your comfort
(2) The quality of each aspect.

|  | Importance | | | Quality | | | |
|---|---|---|---|---|---|---|---|
|  | Low | Medium | High | Poor | Fair | Good | Excellent |
| Admissions | | | | | | | |
| 1) Speed of admissions process | O | O | O | O | O | O | O |
| 2) Courtesy of admissions personnel | O | O | O | O | O | O | O |
| Your Room | | | | | | | |
| 3) Cleanliness | O | O | O | O | O | O | O |
| 4) Temperature | O | O | O | O | O | O | O |
| 5) Noise level in and around room | O | O | O | O | O | O | O |
| 6) How well things worked | O | O | O | O | O | O | O |
| Diet and Meals | | | | | | | |
| 7) Quality of the food | O | O | O | O | O | O | O |
| 8) Menu choices and availability | O | O | O | O | O | O | O |
| 9) Dietician services | O | O | O | O | O | O | O |
| Your Physician | | | | | | | |
| 10) Amount of time your physician spent with you | O | O | O | O | O | O | O |
| 11) Physician's concern for your concerns | O | O | O | O | O | O | O |
| 12) How informative was physician | O | O | O | O | O | O | O |
| Discharge | | | | | | | |
| 13) Advice you were given | O | O | O | O | O | O | O |
| 14) Courtesy and assistance received | O | O | O | O | O | O | O |
| 15) Explanation of your readiness to go home | O | O | O | O | O | O | O |
| Final Ratings | | | | | | | |
| 16) Overall cheerfulness of hospital | O | O | O | O | O | O | O |
| 17) Staff competence | O | O | O | O | O | O | O |
| 18) Other | O | O | O | O | O | O | O |

Figure 3: Prior Art- Patient Survey

Figure 4: Prior Art- Restaurant Survey

Figure 5: Prior Art- Student Election Ballot

Figure 6: Prior Art- Conference Evaluation Form

Figure 7: 30 Question Test Form with Message

Figure 8: 30 Question Test Form with Message and Message Representation

Figure 9: 40 Question Test Form with Message and Message Representation on the bottom of form (landscape orientation)

Figure 10: 50 Question Test Form with Message Watermarked (watermark message is blue)

Figure 11: 30 Question Test Form with Message and Message Representation Across the Bottom of the Form Figure 12: 50 Question Test Form with Message and Message Representation at the Bottom Left Corner of the Form

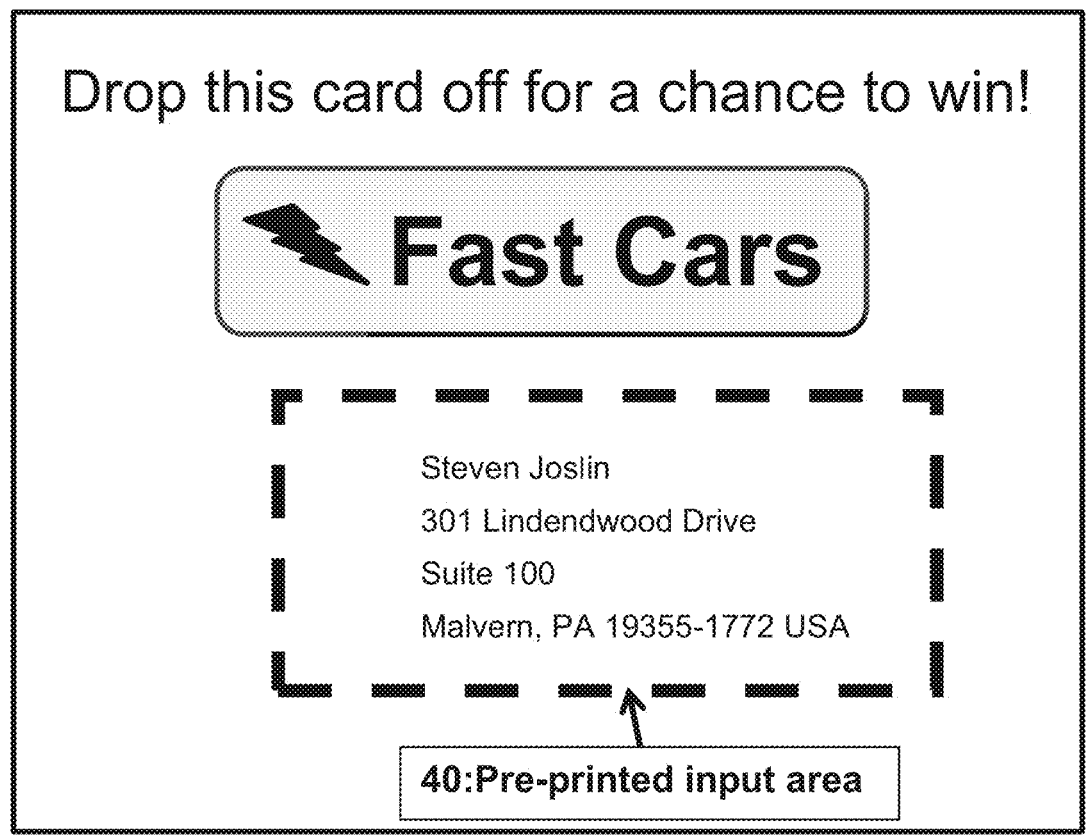
Figure 13: Document with pre-printed input area

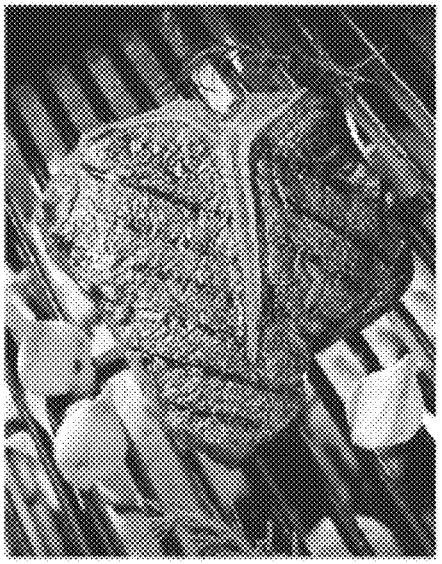
Figure 14: Restaurant Survey with Message and Message Representation

SYSTEM, METHOD, AND ARTICLE OF MANUFACTURE FOR ANALYZING AND SELECTIVELY FURTHER PROCESSING A DOCUMENT

BACKGROUND OF THE INVENTION

Today, schools, universities, hospitals, nonprofits and other businesses are all faced with shrinking budgets and a need to collect data from documents (see FIGS. 1-6) submitted by potential customers, existing customers, employees and students. The cost of these documents and their processing systems need to be accounted for in every organization so they are constantly searching for new revenue streams to offset these costs. Some schools have turned to allowing advertising on their report cards. See, for example, the following articles:

1. Trevor Hughes, "Advertising in schools becoming more common." USA TODAY, Jun. 3, 2012.
2. Greg Toppo and Janet Kornblum, "Ads on tests add up for teacher." USA TODAY, Dec. 1, 2008.
3. Lori Obert and Nelson Garcia, "District to place ad on report cards." KUSA-TV, Nov. 13, 2011.

There are many methods to detect and extract a variety of information from documents such as optical mark recognition (OMR), optical character recognition (OCR) and intelligent character recognition (ICR), also known as handprint recognition, and barcode recognition, but no way to provide adequate proof that messages on a document are being viewed by the target audience. An older proof of performance model for print ads is using a tear sheet supplied by the publisher, showing that your ad has run, but this did not prove who viewed your ad, just lets you know your ad was run in the publication. Another old method for providing proof of viewership of an ad is the use of a perforated card in a publication, where respondents check off some options and mail the card back to the advertiser or agency. This cumbersome process allows advertisers to see who is interested in their products, but not verification on how many people actually saw the ad. However for online ads, there are several ways to obtain proof of performance such as counting clicks, page views, form submissions or other information available from the ad server or web analytics program.

What is needed are automated methods that can quickly detect whether or not one or more messages on a document have been seen; also known as a message impression. Additionally such a method will verify that the correct representation of the message was included in the document. This detection and verification can provide a valid proof of performance to advertisers, thereby greatly enhancing the offering capabilities of the organizations that sell advertising on their documents. Providing a number of verified viewers of an advertisement on a document can validate this type of advertising expenditure to advertisers.

BRIEF SUMMARY OF THE INVENTION

One preferred embodiment of the present invention provides a method and article of manufacture for detecting message impressions from a document. The document includes one or more data collection areas adapted to receive input, and one or more message areas. Each message area includes a message. The method operates as follows:
1. Memory representations of messages are stored in a memory.
2. The document is received at a document processing engine which is adapted to access the memory to obtain the representations of messages.
3. Message impressions are detected from the document by analyzing the document in the document processing engine. Message impressions are detected if it is determined that there is relevant input in the one or more data collection areas, and the document includes a representation of one or more of the messages.

BRIEF DESCRIPTION OF THE DRAWINGS

The foregoing summary as well as the following detailed description of preferred embodiments of the invention, will be better understood when read in conjunction with the appended drawings. For the purpose of illustrating the invention, the drawings show presently preferred embodiments. However, the invention is not limited to the precise arrangements and instrumentalities shown. In the drawings:

Figure 6:
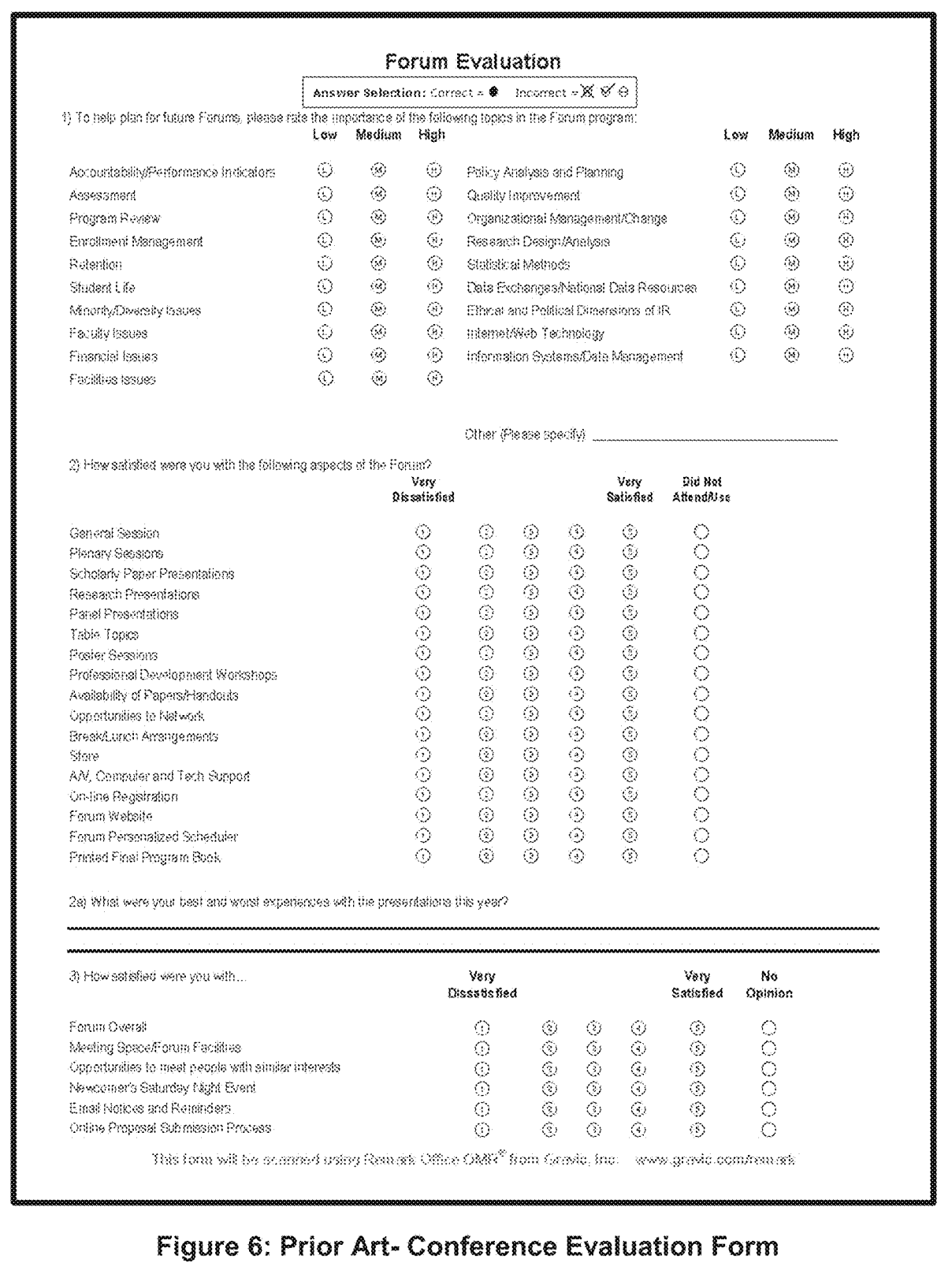

FIGS. 1-6 show prior art pictures for various data collection documents across a variety of industries (tests, surveys, evaluations, ballots).

FIGS. 7-12 show different embodiments of the present invention using a test form with a message or message area.

FIG. 13 shows a document with a pre-printed input area that can be turned in without user input since the user's information is pre-printed on the card.

FIG. 14 shows an embodiment of the invention using a survey form with a message area for an incentive on it and also data collection areas for user input.

DETAILED DESCRIPTION OF THE INVENTION

Certain terminology is used herein for convenience only and is not to be taken as a limitation on the present invention.

I. Definitions

The following definitions are provided to promote understanding of the present invention.

Message area—A location on a document that contains a message. Message areas can be located on any area of a document.

Message representation—A likeness of a message which can be an image, code, text or other type of identifier.

Message impression—A message is impressed on a user.

Direct representation—An exact likeness of the message, including the exact image or text.

Indirect representation—A code or partial value obtained from the message area used to identify the message.

Digital representation—The use of discrete impulses or quantities arranged in coded patterns to represent variables or other data in the form of numbers or characters.

Relevant input—Verifiable input in a data collection area of a document. For example, a student filling in answer bubbles on a test would be considered relevant input. Additionally, pre-printed input like a name or address would also be considered relevant input.

Types of document processing—Scanning, faxing, document cameras, cell phones, tablets, OCR, OMR, ICR, barcode reading.

II. Test forms, Documents and Survey Forms with a Message or Message Area

Figure 7:
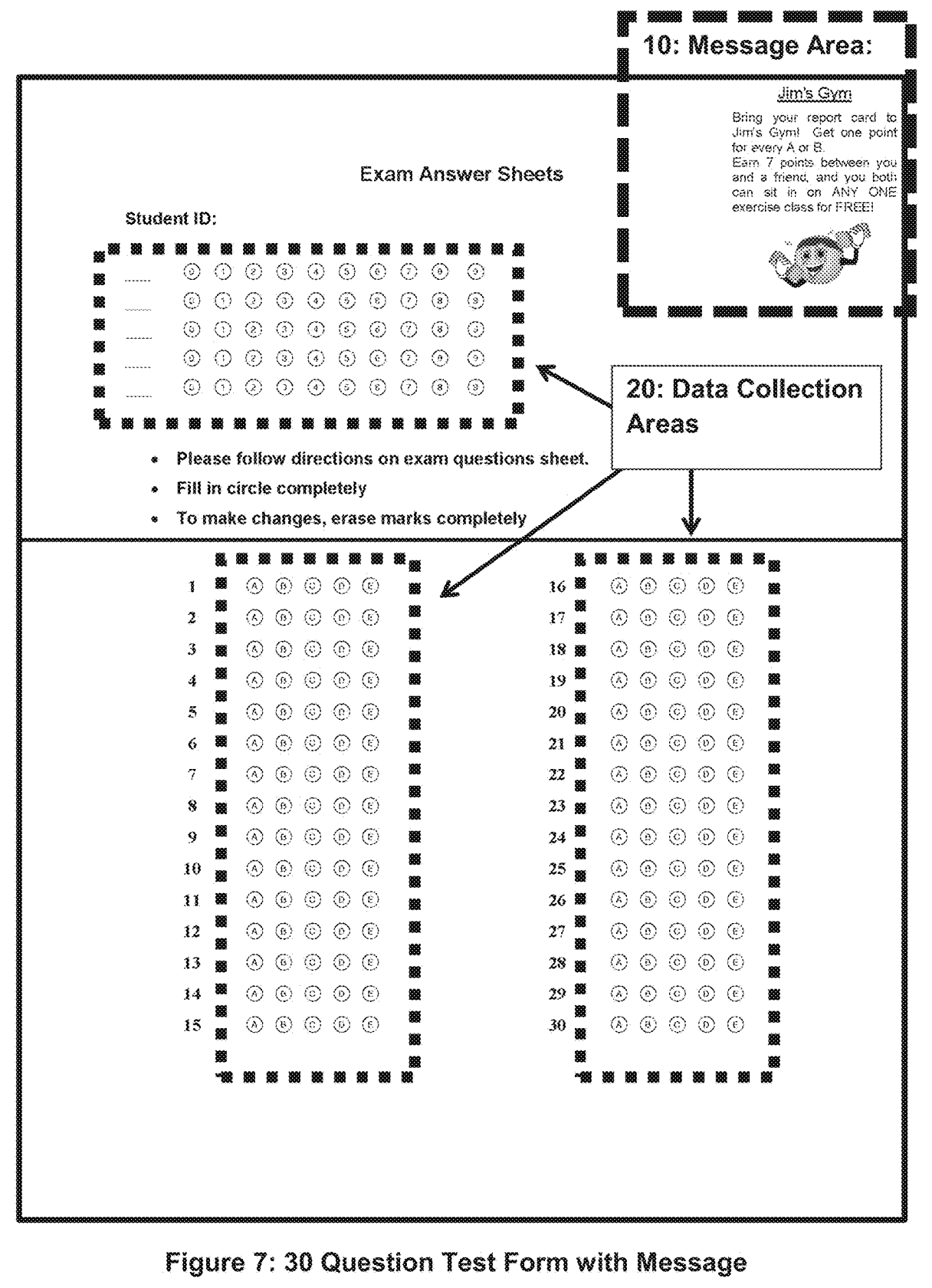

FIG. 7 shows an embodiment of the invention using a test form with a message area (10) for an advertisement on it and also data collection areas (20) for user input.

Figure 8:
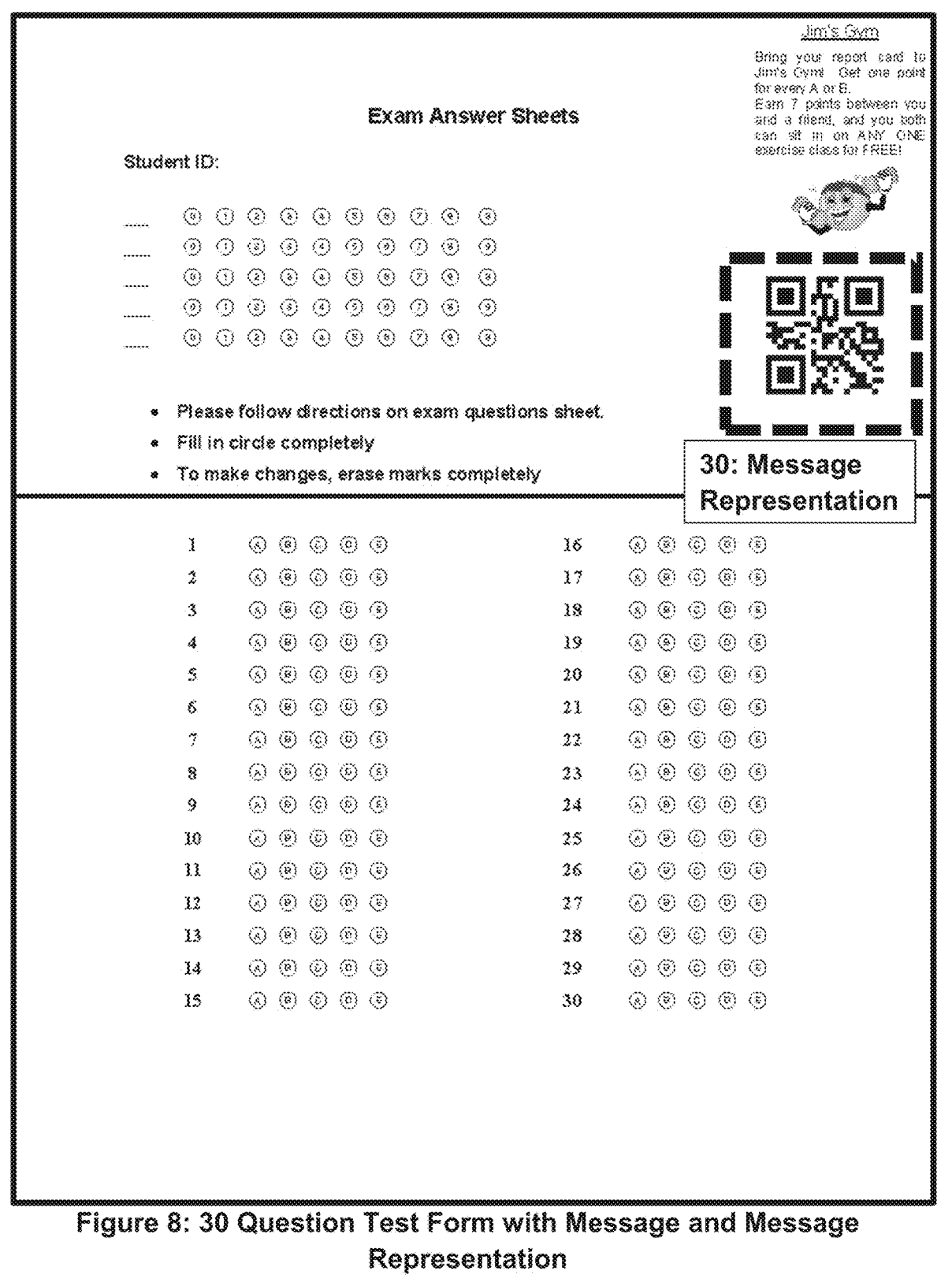

FIG. 8 shows an embodiment of the invention using a test form with a message area for an advertisement on it and also a message representation consisting of a QR code (30).

Figure 9:
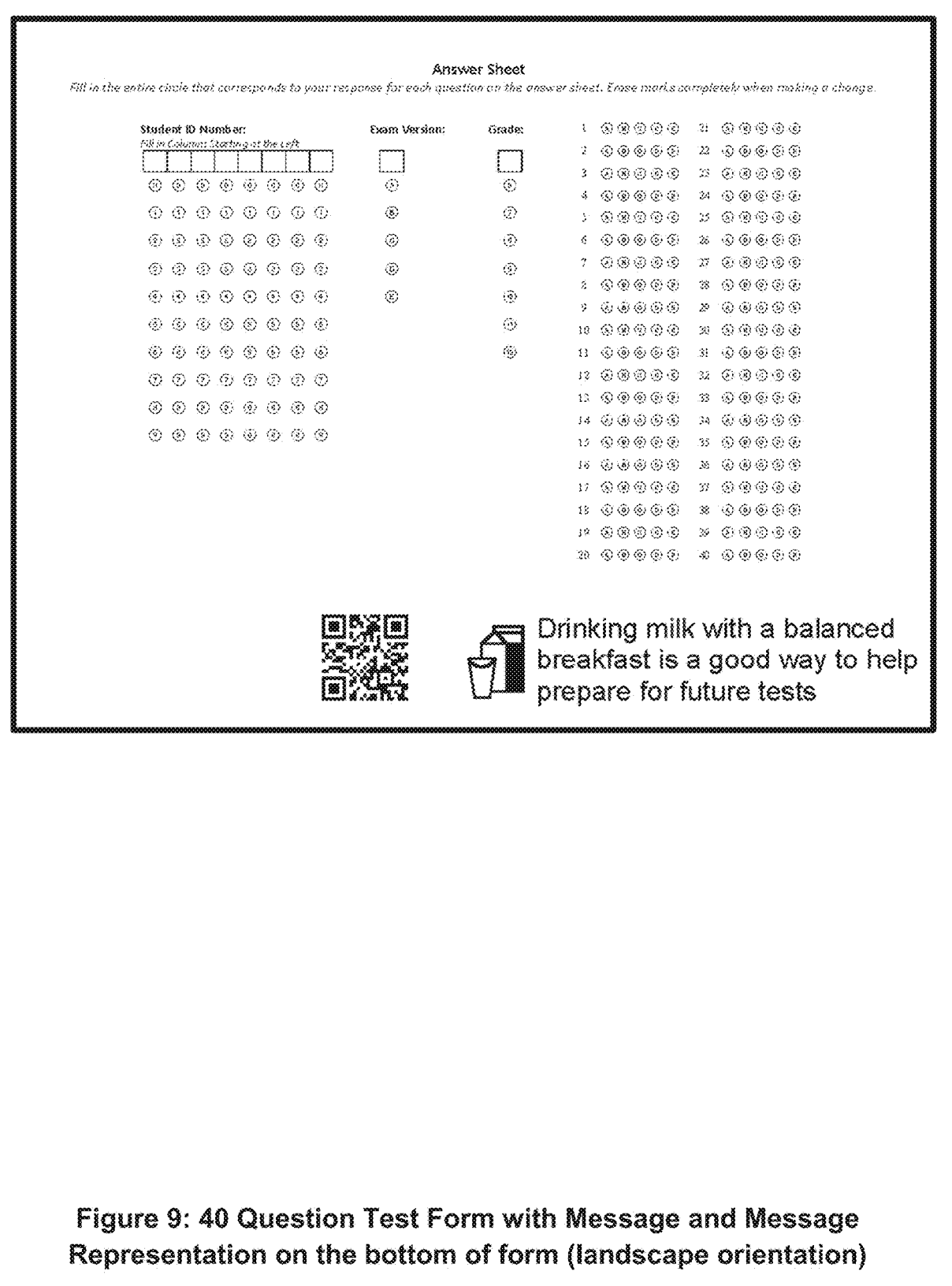

FIG. 9 shows an embodiment of the invention using test forms with a message area for an advertisement on it and also a message representation consisting of a QR code.

FIG. 10 shows an embodiment of the invention using a test form containing a watermark message.

FIG. 11 shows an embodiment of the invention using a test form with a message area across the bottom of the document and also a message representation consisting of a QR code.

FIG. 12 shows an embodiment of the invention using a test form with a message area on the bottom left corner of the document and also a message representation consisting of a QR code.

FIG. 13 shows a document with a pre-printed input area (40). This document would be turned in without user input since the user's information is pre-printed on the card.

FIG. 14 shows an embodiment of the invention using a survey form with a message area for an incentive on it and also data collection areas for user input.

III. Hardware for Setup

Figure 15:
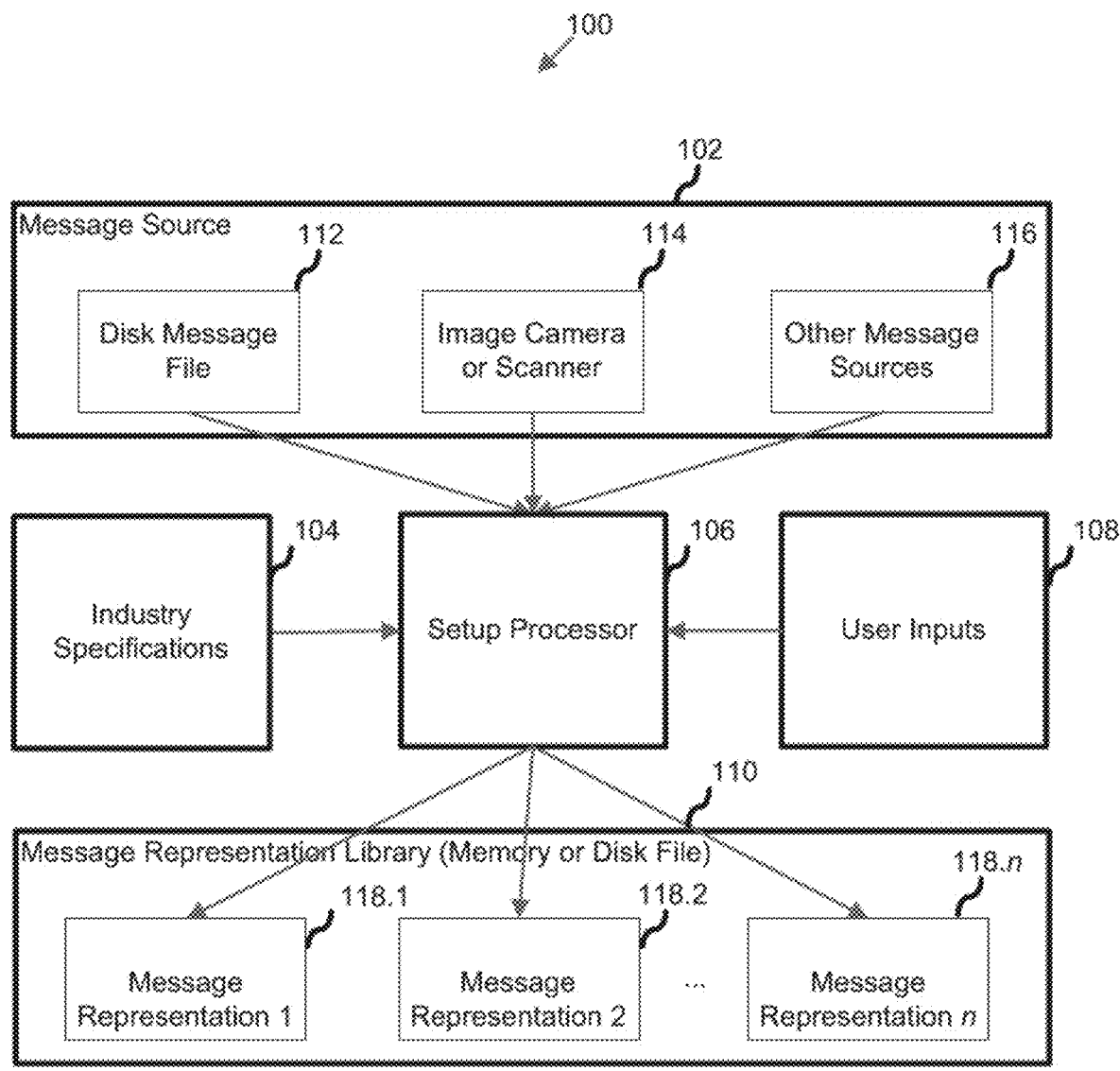
FIG. 15 shows a setup hardware schematic diagram in accordance with a preferred embodiment of the present invention.

FIG. 15 shows a hardware setup configuration 100 for this process. A message source 102 typically comes from one of several different possible sources, including a disk message file 112, an image camera or scanner 114, or other message sources 116. The message source 102 information is sent to the setup processor 106 along with industry specifications 104 and user inputs 108. The setup processor 106 analyzes the message source information 102 using industry specifications 104 and user inputs 108 to create a representation of the message that can be used to later identify instances of the same message. The results are stored as message representation 118.1 through message representation 118.n in a message representation library 110, which can use both memory and disk for storage.

IV. Hardware for Operation

Figure 16:
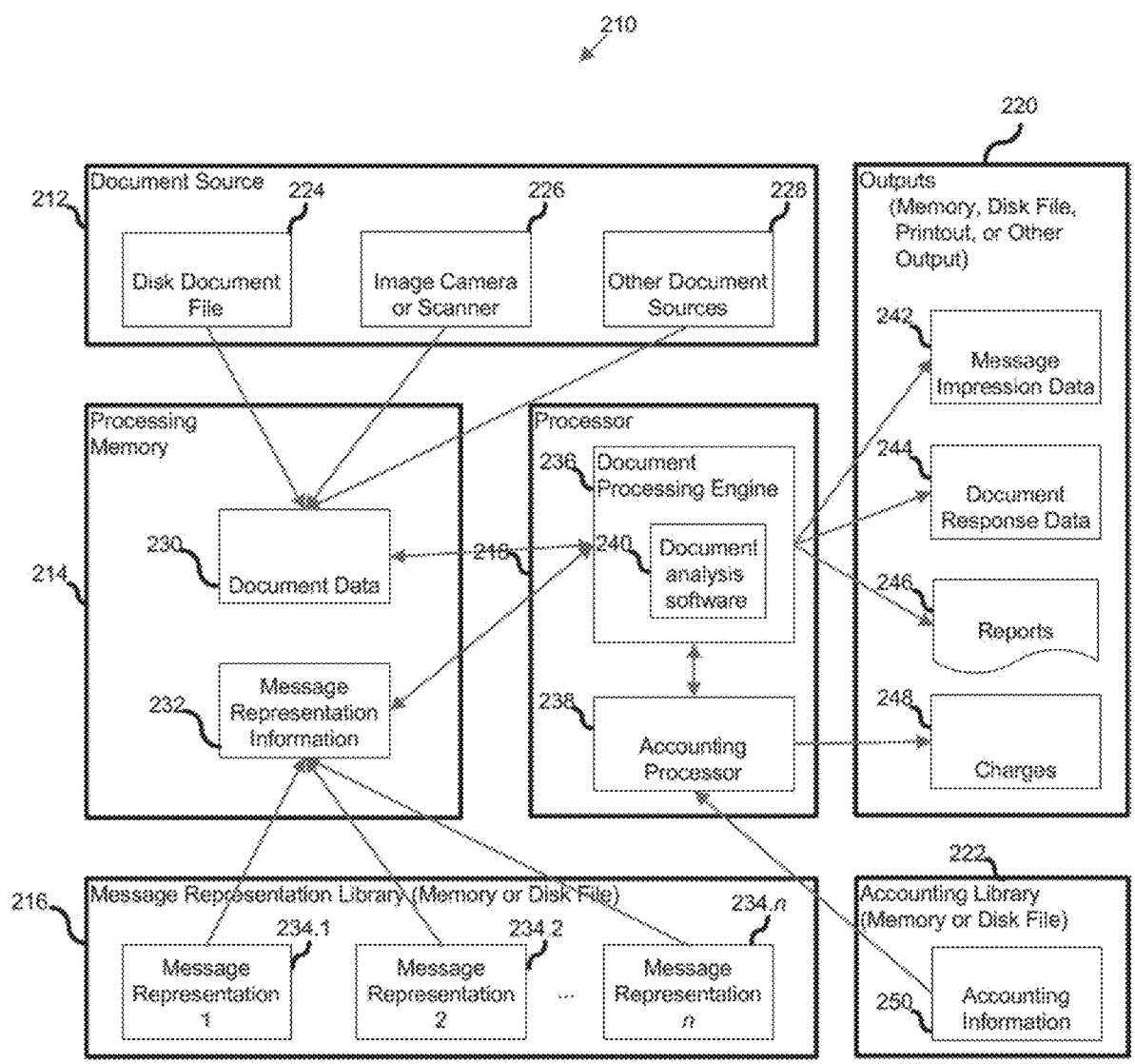
FIG. 16 shows an operational hardware schematic diagram in accordance with a preferred embodiment of the present invention.

FIG. 16 shows an operation hardware configuration 210 for this process. Document source 212 typically comes from one of several different possible sources, including a disk document file 224, an image camera or scanner 226, or other image sources 228. The document source 212 information is then sent into processing memory 214, wherein document data 230 is determined using the document source information. At the same time, information from message representations 234.1 through 234.n in message representation library 216 is sent into message representation information 232 in processing memory 214, where the information needed to identify different messages are stored. The document data 230 and the message representation information 232 are then passed into processor 218 where document processing engine 236 uses document analysis software 240 to recognize response data and identify messages within document data 230 wherein the message impression data 242, document responses data 244, and reports 248 are sent to outputs 220 which include memory, disk file, printout and other outputs. Additionally, as messages are identified in document processing engine 236, accounting processor 238 calculates charges 248 based on accounting information 250 stored in accounting library 222 and sends the charges 248 to outputs 220 which include memory, disk file, printout and other outputs.

V. Process Flow

Figure 17:
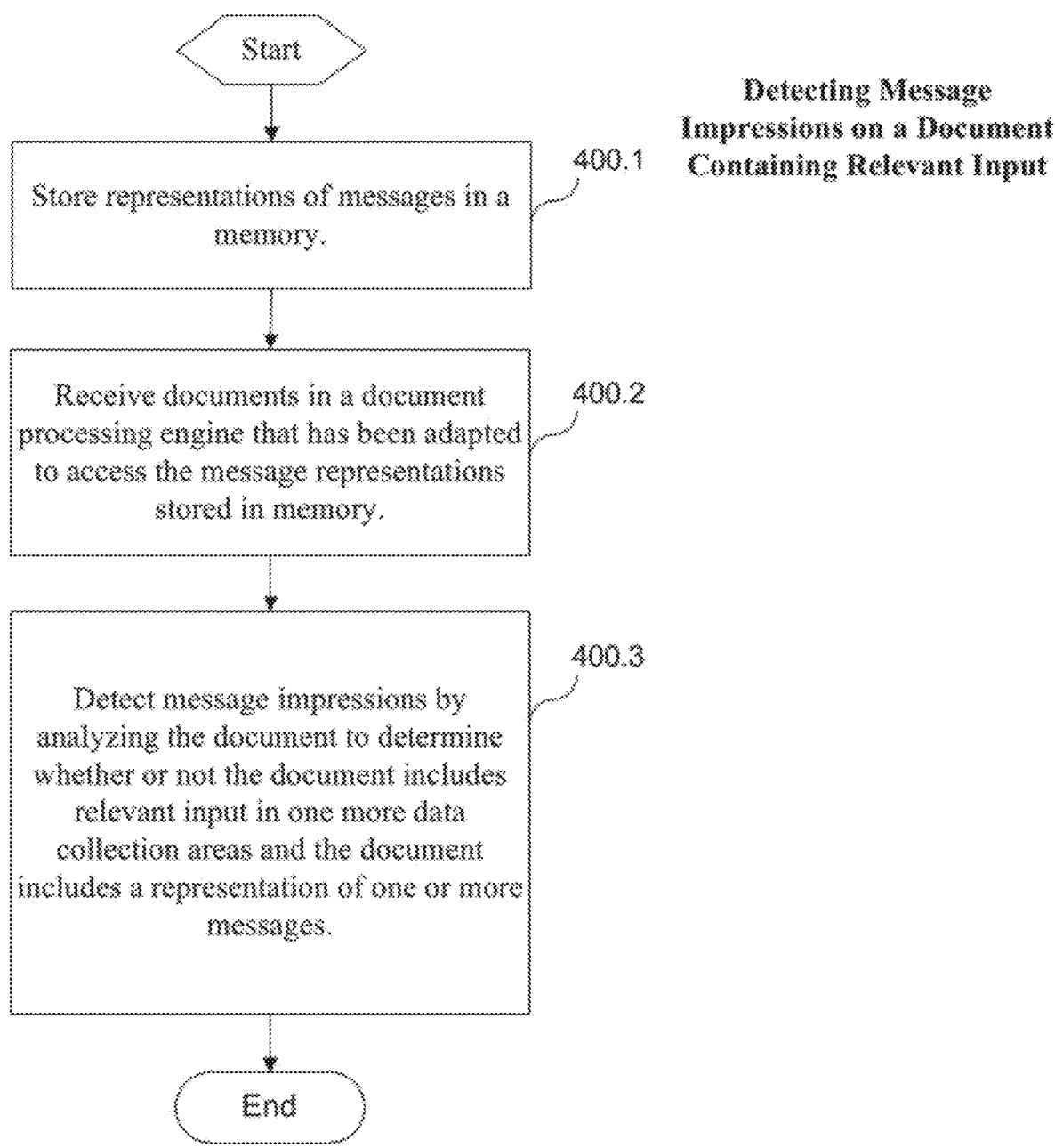
FIG. 17 shows a work flow diagram that illustrates one preferred embodiment of the present invention.

In a preferred embodiment of this process as described in steps 400.1 through 400.3 of FIG. 17, representations of messages are stored in a computer memory. When documents are received by the document processing engine, the document processing engine analyzes the document to determine whether or not one or more data collection areas on the document contain relevant input. The document processing engine also analyzes the document to determine whether or not the document includes a representation of one or more of the messages that are stored in memory. If the document processing engine determines that the document does include one or more representations of a message stored in memory and the document contains input in one or more data collection areas, then a message impression has been detected. One possible type of input in the data collection areas of the document includes user input. Some possible types of data collection areas include test question response areas where the input would be responses to test questions and survey question response areas where the input would be responses to survey questions.

VI. Additional Considerations and Alternative Embodiments

Some possible message types include advertisements, coupons, well wishes, slogans, endorsements, incentives, and solicitations. Messages may also provide incentive for the respondent to complete the form. One such example would be a coupon or discount on a test document which could only be redeemed if the respondent achieved above a set threshold. Message representations include both direct and indirect representations of messages. Some possible types of indirect representations of a message include codes, text, and patterns. Some possible types of direct representations of a message include digital representations of the message and digital representations of a portion of the message. Some possible types of document processing engines used to detect message representations include optical mark readers, optical character readers, intelligent character readers, barcode readers and pattern recognition software. Some possible types of documents include electronic documents which include documents stored in Adobe PDF format and paper documents that have been scanned or digitally imaged.

In an extension of this embodiment, detected messages impressions would be recorded.

In another extension of this embodiment, the document has an intended recipient and the input on the document includes data that identifies the intended recipient. The student ID number data collection area on FIG. 7 is one example of a document that includes data that identifies the intended recipient. Identifier data includes information provided by the recipient of the document as well as information that is pre-printed on the document. Some examples of recipient identifier data include names, addresses, social security numbers, identification numbers and codes, and phone numbers as well as data that describe the intended recipient like age, gender, ethnicity, race, height, weight, and socioeconomic status. When the document processing engine analyzes the document, it records the recipient's identifier data along with the detected message impressions. In this way, it is possible to track the recipients of messages. Taken further, it can be used to ensure certain target populations are being reached with a message. The data identifying the intended recipient could be pre-printed or completed by a recipient of the document. If the data identifying the recipient is pre-printed, then certain populations of document recipients could be targeted with specific messages.

In another extension of this embodiment, a charge is issued for the one or more detected message impressions. In this manner, charges can be issued only for messages that were verified to have been viewed by a recipient of the document.

In another extension of this embodiment, an accounting processor would store cost per impression data for detected message impressions and track the number of detected message impressions to determine the amount to be charged for the total number of detected message impressions.

In another extension of this embodiment, the document would be accepted for further processing of the input in the one or more data collection areas if it is determined that the document includes a representation of one or more of the appropriate messages. Conversely, the document would be rejected for further processing of the input if it is determined that the document does not include a representation of one or more appropriate messages. For example, if the document was a test, the test would only be graded if the document processing engine determined that the appropriate message representation was included on the document.

In another extension of this embodiment, the data collection areas on the document include test question response areas where the input for those areas are test question responses. Additionally one or more messages on the form may include advertisements that provide information relevant to one or more of the test questions. FIG. 7 provides an example of a document that includes data collection areas 20 that are test questions and a message area 10 that includes information relevant to the test questions by rewarding students for answering questions correctly.

In another extension of this embodiment, the data collection areas on the document include survey question response areas where the input for those areas are survey question responses. Additionally one or more messages on the form may include advertisements that provide information relevant to one or more of the survey questions. FIG. 14 provides an example of a document that includes data collection areas that are survey questions and a message area that includes information relevant to the survey questions by rewarding respondents for completing the survey questions and returning the form.

The present invention may be implemented with any combination of hardware and software. If implemented as a computer-implemented apparatus, the present invention is implemented using means for performing all of the steps and functions described above.

When implemented in software, the software code can be executed on any suitable processor or collection of processors, whether provided in a single computer or distributed among multiple computers.

The present invention can also be included in an article of manufacture (e.g., one or more computer program products) having, for instance, computer readable storage media. The storage media has computer readable program code stored therein that is encoded with instructions for execution by a processor for providing and facilitating the mechanisms of the present invention. The article of manufacture can be included as part of a computer system or sold separately.

The storage media can be any known media, such as computer memory, one or more floppy discs, compact discs, optical discs, magnetic tapes, flash memories, circuit configurations in Field Programmable Gate Arrays or other semiconductor devices, or other tangible computer storage medium. The storage media can be transportable, such that the program or programs stored thereon can be loaded onto one or more different computers or other processors to implement various aspects of the present invention as discussed above.

The computer(s) used herein may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable, mobile, or fixed electronic device.

The computer(s) may have one or more input and output devices. These devices can be used, among other things, to present a user interface. Examples of output devices that can be used to provide a user interface include printers or display screens for visual presentation of output and speakers or other sound generating devices for audible presentation of output.

Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

The terms "program" or "software" are used herein in a generic sense to refer to any type of computer code or set of computer-executable instructions that can be employed to program a computer or other processor to implement various aspects of the present invention as discussed above. The computer program need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, and the like, that perform particular tasks or implement particular abstract data types. The functionality of the program modules may be combined or distributed as desired in various embodiments.

Data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Preferred embodiments of the present invention may be implemented as methods, of which examples have been provided. The acts performed as part of the methods may be ordered in any suitable way. Accordingly, embodiments may be constructed in which acts are performed in an order different than illustrated, which may include performing some acts simultaneously, even though such acts are shown as being sequentially performed in illustrative embodiments.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. A method of analyzing a document and selectively further processing any input made in a data collection area of the document using a document processing system that includes a document processing engine and a message representation library, the document including one or more data collection areas which are located in and are part of the document, and which are capable of receiving input, the method comprising:

(a) storing in a memory of the message representation library representations of static human identifiable and human understandable messages;

(b) receiving the document at the document processing engine, wherein the document processing engine accesses the memory to obtain the representations of static human identifiable and human understandable messages;

(c) analyzing the document in the document processing engine to determine whether:
  (i) there is relevant input in the one or more data collection areas which are located in and are part of the document, and
  (ii) the document includes one or more message areas, each message area having a static human identifiable and human understandable message, wherein the message area does not receive input, and
  wherein the analyzing in step (c)(ii) determines if the library of representations of static human identifiable and human understandable messages includes the static human identifiable and human understandable message in each of the one or more message areas;

(d) detecting message impressions from the document in the document processing engine when:
  (i) there is relevant input in the one or more data collection areas which are located in and are part of the document, and
  (ii) the document includes one or more of the static human identifiable and human understandable messages; and (e) accepting the document for further processing of any input in the one or more data collection areas by the document processing engine when the document includes one or more of the static human identifiable and human understandable messages, and rejecting the document for further processing of any input in the one or more data collection areas by the document processing engine when the document does not include one or more of the static human identifiable and human understandable messages.

2. The method of claim 1 wherein the representation is a direct representation of each static human identifiable and human understandable message.

3. The method of claim 2 wherein the direct representation is in the form of a digital representation of the static human identifiable and human understandable message.

4. The method of claim 2 wherein the direct representation is in the form of a digital representation of a portion of the static human identifiable and human understandable message.

5. The method of claim 1 wherein the document has an intended recipient, and the input includes identifier data regarding the intended recipient, the method further comprising:
(f) the document processing engine reading the identifier data and recording the identifier data and the detected message impressions.

6. The method of claim 1 further comprising:
(f) the document processing engine recording the detected message impressions, thereby tracking detected message impressions.

7. The method of claim 1 further comprising:
(f) charging, via an accounting processor, for detected message impressions.

8. The method of claim 1 wherein the input is user input.

9. The method of claim 1 wherein the document is an electronic document.

10. The method of claim 1 wherein the document is a paper document, and wherein the receiving step (b) includes scanning the document.

11. The method of claim 1 wherein the document is a paper document, and wherein the receiving step (b) includes taking a digital picture of the document.

12. The method of claim 1 wherein an accounting processor stores cost per impression data for detected message impressions, the method further comprising:
(f) tracking in the accounting processor the number of detected message impressions and determining the amount to be charged for the total number of detected message impressions.

13. The method of claim 1 wherein one or more of the message areas includes a static human identifiable and human understandable message in the form of an advertisement.

14. The method of claim 1 wherein the one or more data collection areas include test question response areas, the received input for such areas being test question responses.

15. The method of claim 1 wherein the one or more data collection areas include survey question response areas, the received input for such areas being survey question responses.

16. The method of claim 1 wherein the one or more data collection areas include test question response areas, the received input for such areas being test question responses, and wherein one or more of the message areas includes a static human identifiable and human understandable message in the form of an advertisement, and wherein the advertisements in the one or more message areas provide information relevant to a test question.

17. The method of claim 1 wherein the document processing engine is selected from the group consisting of an optical character reader, optical mark reader, bar code reader, and an intelligent character reader.

18. A computer program product for analyzing a document and selectively further processing any input made in a data collection area of the document using a document processing system that includes (i) a document processing engine, and (ii) a message representation library that storing in a memory of the message representation library representations of static human identifiable and human understandable messages, the document including one or more data collection areas which are located in and are part of the document, and which are capable of receiving input, the computer program product comprising non-transitory computer-readable media encoded with instructions for execution by the document processing engine to perform a method comprising:
(a) receiving the document at the document processing engine, wherein the document processing engine accesses the memory to obtain the representations of static human identifiable and human understandable messages;
(b) analyzing the document in the document processing engine to determine whether:
   (i) there is relevant input in the one or more data collection areas which are located in and are part of the document, and
   (ii) the document includes one or more message areas, each message area having a static human identifiable and human understandable message, wherein the message area does not receive input, and
   wherein the analyzing in step (b)(ii) determines if the library of representations of static human identifiable and human understandable messages includes the static human identifiable and human understandable message in each of the one or more message areas;
(c) detecting message impressions from the document in the document processing engine when:
   (i) there is relevant input in the one or more data collection areas which are located in and are part of the document, and
   (ii) the document includes one or more of the static human identifiable and human understandable messages; and
(d) accepting the document for further processing of any input in the one or more data collection areas by the document processing engine when the document includes one or more of the static human identifiable and human understandable messages, and rejecting the document for further processing of any input in the one or more data collection areas by the document processing engine when the document does not include one or more of the static human identifiable and human understandable messages.

19. The computer program product of claim 18 wherein the representation is a direct representation of each static human identifiable and human understandable message.

20. The computer program product of claim 19 wherein the direct representation is in the form of a digital representation of the static human identifiable and human understandable message.

21. The computer program product of claim 19 wherein the direct representation is in the form of a digital representation of a portion of the static human identifiable and human understandable message.

22. The computer program product of claim 18 wherein the document has an intended recipient, and the input includes identifier data regarding the intended recipient, and wherein the instructions for execution by the document processing engine perform a method further comprising:
(e) the document processing engine reading the identifier data and recording the identifier data and the detected message impressions.

23. The computer program product of claim 18 wherein the instructions for execution by the document processing engine perform a method further comprising:
(e) recording the detected message impressions, thereby tracking detected message impressions.

24. The computer program product of claim 18 wherein the instructions for execution by the document processing engine perform a method further comprising:
(e) outputting detected message impressions to an accounting processor for charging, via the accounting processor, for detected message impressions.

25. The computer program product of claim 18 wherein the input is user input.

26. The computer program product of claim 18 wherein the document is an electronic document.

27. The computer program product of claim 18 wherein the document is a paper document, and wherein the receiving step (a) includes scanning the document.

28. The computer program product of claim 18 wherein the document is a paper document, and wherein the receiving step (a) includes taking a digital picture of the document.

29. The computer program product of claim 18 wherein an accounting processor stores cost per impression data for detected message impressions, and wherein the instructions for execution by the document processing engine perform a method further comprising:
(e) outputting detected message impressions to the accounting processor for tracking in the accounting processor the number of detected message impressions and determining the amount to be charged for the total number of detected message impressions.

30. The computer program product of claim 18 wherein one or more of the message areas includes a static human identifiable and human understandable message in the form of an advertisement.

31. The computer program product of claim 18 wherein the one or more data collection areas include test question response areas, the received input for such areas being test question responses.

32. The computer program product of claim 18 wherein the one or more data collection areas include survey question response areas, the received input for such areas being survey question responses.

33. The computer program product of claim 18 wherein the one or more data collection areas include test question response areas, the received input for such areas being test question responses, and wherein one or more of the message areas includes a static human identifiable and human understandable message in the form of an advertisement, and wherein the advertisements in the one or more message areas provide information relevant to a test question.

34. The computer program product of claim 18 wherein the document processing engine is selected from the group consisting of an optical character reader, optical mark reader, bar code reader, and an intelligent character reader.

35. A document processing system for analyzing a document and selectively further processing any input made in a data collection area of the document, the document including one or more data collection areas which are located in and are part of the document, and which are capable of receiving input, the document processing system comprising:

(a) a message representation library that stores in a memory representations of static human identifiable and human understandable messages; and (b) a document processing engine in communication with the message representation library, the document processing engine receiving the document and configured to:
- (i) access the memory of the message representation library to obtain the representations of static human identifiable and human understandable messages,
- (ii) analyze the document to determine whether:
    - (A) there is relevant input in the one or more data collection areas which are located in and are part of the document, and
    - (B) the document includes one or more message areas, each message area having a static human identifiable and human understandable message, wherein the message area does not receive input, and wherein the analyzing in step (b)(ii)(B) determines if the library of representations of static human identifiable and human understandable messages includes the static human identifiable and human understandable message in each of the one or more message areas;
- (iii) detect message impressions from the document when:
    - (A) there is relevant input in the one or more data collection areas which are located in and are part of the document, and
    - (B) the document includes one or more of the static human identifiable and human understandable messages, and
- (iv) accept the document for further processing of any input in the one or more data collection areas when the document includes one or more of the static human identifiable and human understandable messages, and reject the document for further processing of any input in the one or more data collection areas when the document does not include one or more of the static human identifiable and human understandable messages.

36. The document processing system of claim 35 wherein the representation is a direct representation of each static human identifiable and human understandable message.

37. The document processing system of claim 36 wherein the direct representation is in the form of a digital representation of the static human identifiable and human understandable message.

38. The document processing system of claim 36 wherein the direct representation is in the form of a digital representation of a portion of the static human identifiable and human understandable message.

39. The document processing system of claim 35 wherein the document has an intended recipient, and the input includes identifier data regarding the intended recipient, and wherein the document processing engine is further configured to:

(v) read the identifier data and record the identifier data and the detected message impressions.

40. The document processing system of claim 35 wherein the document processing engine is further configured to:

(v) record the detected message impressions, and thereby track detected message impressions.

41. The document processing system of claim 35 further comprising:

(c) an accounting processor in communication with an output of the document processing engine configured to charge for detected message impressions.

42. The document processing system of claim 35 wherein the input is user input.

43. The document processing system of claim 35 wherein the document is an electronic document.

44. The document processing system of claim 35 wherein the document is a paper document, and wherein the document processing engine receives and scans the document.

45. The document processing system of claim 35 wherein the document is a paper document, and wherein the document processing engine receives and takes a digital picture of the document.

46. The document processing system of claim 35 further comprising:

(c) an accounting processor in communication with an output of the document processing engine configured to:
- (i) store cost per impression data for detected message impressions, and
- (ii) track the number of detected message impressions and determine the amount to be charged for the total number of detected message impressions.

47. The document processing system of claim 35 wherein one or more of the message areas includes a static human identifiable and human understandable message in the form of an advertisement.

48. The document processing system of claim 35 wherein the one or more data collection areas include test question response areas, the received input for such areas being test question responses.

49. The document processing system of claim 35 wherein the one or more data collection areas include survey question response areas, the received input for such areas being survey question responses.

50. The document processing system of claim 35 wherein the one or more data collection areas include test question response areas, the received input for such areas being test question responses, and wherein one or more of the message areas includes a static human identifiable and human understandable message in the form of an advertisement, and wherein the advertisements in the one or more message areas provide information relevant to a test question.

51. The document processing system of claim 35 wherein the document processing engine is selected from the group consisting of an optical character reader, optical mark reader, bar code reader, and an intelligent character reader.

* * * * *

UNITED STATES PATENT AND TRADEMARK OFFICE
CERTIFICATE OF CORRECTION

PATENT NO. : 10,891,577 B2
APPLICATION NO. : 13/727055
DATED : January 12, 2021
INVENTOR(S) : Joslin et al.

Page 1 of 1

It is certified that error appears in the above-identified patent and that said Letters Patent is hereby corrected as shown below:

In the Claims

Column 9, Line 11 (Claim 18, Line 5): change "storing" to --stores--

Signed and Sealed this
Sixth Day of April, 2021

Drew Hirshfeld
*Performing the Functions and Duties of the
Under Secretary of Commerce for Intellectual Property and
Director of the United States Patent and Trademark Office*